(12) United States Patent
Yung et al.

(10) Patent No.: US 8,975,935 B1
(45) Date of Patent: Mar. 10, 2015

(54) ANALOG PULSE DELAY CIRCUIT WITH MULTIPLE OUTPUT POTENTIAL

(71) Applicant: HRL Laboratories, LLC, Malibu, CA (US)

(72) Inventors: Michael W. Yung, Los Angeles, CA (US); Jose M. Cruz-Albrecht, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 63 days.

(21) Appl. No.: 13/931,024

(22) Filed: Jun. 28, 2013

(51) Int. Cl.
    *H03H 11/26* (2006.01)
    *G06N 3/063* (2006.01)

(52) U.S. Cl.
    CPC .................. *G06N 3/0635* (2013.01)
    USPC ............ 327/263; 327/264; 327/272; 327/281

(58) Field of Classification Search
None
See application file for complete search history.

(56) References Cited

U.S. PATENT DOCUMENTS

| | | | |
|---|---|---|---|
| 3,569,842 A | | 3/1971 | Schroyer |
| 3,824,411 A | | 7/1974 | Wharton |
| 5,387,882 A | * | 2/1995 | Schoofs ........................ 331/111 |
| 5,650,739 A | * | 7/1997 | Hui et al. ...................... 327/262 |
| 5,907,250 A | * | 5/1999 | Baizley et al. ................... 327/18 |
| 6,052,011 A | * | 4/2000 | Dasgupta ...................... 327/270 |
| 6,121,811 A | * | 9/2000 | Scott et al. ..................... 327/276 |
| 6,124,746 A | * | 9/2000 | Van Zalinge .................. 327/280 |
| 6,466,076 B2 | * | 10/2002 | Yoshikawa ..................... 327/382 |
| 7,587,541 B2 | * | 9/2009 | Chen et al. ..................... 710/110 |
| 7,724,168 B1 | | 5/2010 | Cruz-Albrecht et al. |
| 7,750,835 B1 | | 7/2010 | Cruz-Albrecht et al. |
| 7,822,698 B1 | | 10/2010 | Cruz-Albrecht et al. |
| 2002/0027465 A1 | * | 3/2002 | Yoshikawa ..................... 327/277 |
| 2004/0217794 A1 | * | 11/2004 | Strysko ......................... 327/263 |
| 2010/0109626 A1 | * | 5/2010 | Chen .............................. 323/282 |
| 2012/0011089 A1 | | 1/2012 | Aparin et al. |
| 2012/0150781 A1 | | 6/2012 | Arthur et al. |

OTHER PUBLICATIONS

U.S. Appl. No. 13/151,763, filed Jun. 2011, Cruz-Albrecht, et al.
J. Cruz-Albrecht, M. Yung and Srinivasa. "Energy-Efficient Neuron, Synapse and STDP Circuits," *IEEE Trans. on Biomedical Circuits and Systems*, pp. 246-256, vol. 6, No. 3, Jun. 2012.
J. Lazzaro. LowPower Silicon Spiking Neurons and Axons,h *IEEE Symposium on Circuits and Systems*, pp. 2220-2223, 1992.
C. Bartolozzi et al. "Silicon Synaptic Homoestasis" *Brain Inspired Cognitive Systems*, Oct. 2006.
ISR and WO for related PCT/US2012/065640 mailed on Mar. 28, 2013.

* cited by examiner

*Primary Examiner* — Tuan T Lam
(74) *Attorney, Agent, or Firm* — Ladas & Parry

(57) ABSTRACT

A delay circuit includes a first flip flop (FF), a transistor connected to the FF, a first resistor capacitor circuit (RCC) coupled to the transistor and between a voltage and a ground, a first comparator for comparing an output of the first RCC and a voltage reference, gate logic coupled to the input line and to an output of the first FF and to a second FF, a second transistor coupled to the second FF, a second RCC coupled to the second transistor and between the voltage and ground, a second comparator for comparing an output of the second RCC and the voltage reference and coupled to the first FF, and output logic coupled to the first and second comparators.

19 Claims, 5 Drawing Sheets

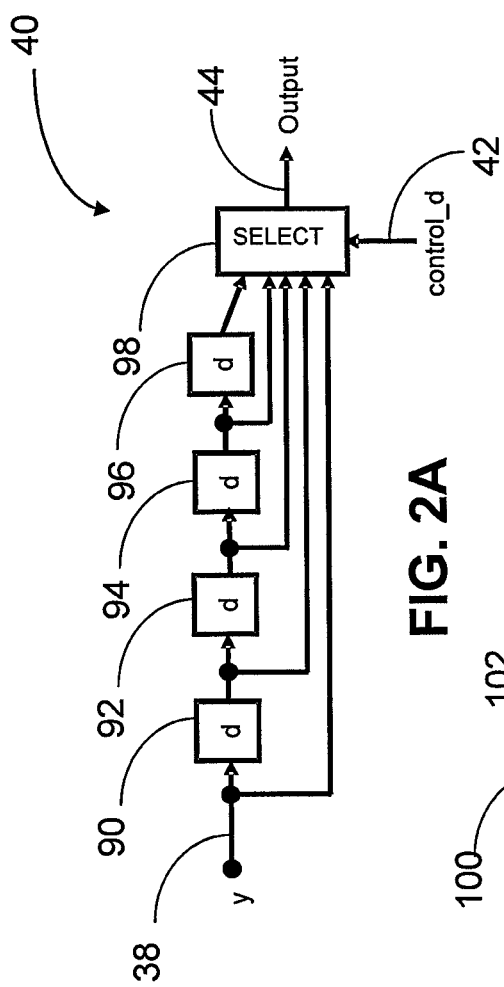
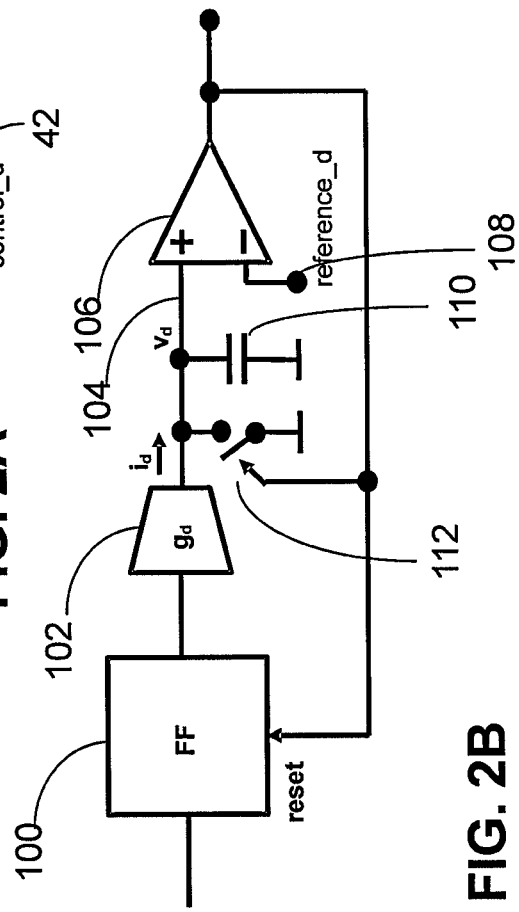
FIG. 2A
FIG. 2B

ANALOG PULSE DELAY CIRCUIT WITH MULTIPLE OUTPUT POTENTIAL

STATEMENT REGARDING FEDERAL FUNDING

This invention was made under U.S. Government contract HRL0011-09-C-0001. The U.S. Government has certain rights in this invention.

CROSS REFERENCE TO RELATED APPLICATIONS

This application is related to U.S. application Ser. No. 13/679,727, filed Nov. 16, 2012, which is incorporated herein as though set forth in full.

TECHNICAL FIELD

This disclosure relates to neural processing and in particular to neuron circuits and delay circuits.

BACKGROUND

The human brain contains around $10^{11}$ neurons and $10^{15}$ synapses. Neurons, synapses and the networks of them that form the human brain are very complex biological systems. FIG. 1A shows a simplified diagram of a biological neuron. In FIG. 1A, the neuron receives multiple excitatory input current signals ($i_1, i_2, i_3 \ldots$) and produces a single output signal $v_{out}$. There is a delay through the axon, which may be referred to as axonal delay. FIG. 1B shows an example of a typical output signal. It consists of a stream of spikes, which are pulses of short duration. The output information is encoded into the timing of these spikes ($t_1, t_2 \ldots$).

FIG. 1C shows a simplified model of the synapse circuit. The input terminal of the synapse is designated to receive the output voltage signal of a presynaptic neuron. This voltage is called the presynaptic input voltage and is denoted as $v_{pre}$. The output terminal of the synapse is designated to provide a current into the input node of the postsynaptic neuron. This output current of the synapse is denoted as $i_s$.

Neural computers have been used to model the behavior of neurons and synapses and circuits for modeling their behavior have been proposed. In U.S. patent application Ser. No. 13/151,763, filed Jun. 12, 2011, J. Cruz-Albrecht, P. Petre and N. Srinivasa, describe a "High-Order Time Encoded Based Neuron Circuit". The circuit described has many biological mechanisms but does not include the circuits to emulate the features of kinetic dynamics, homeostatic plasticity, and axonal delays.

Kinetic dynamics refer to the signal dynamics associated with the synapses of a neuron. In particular, kinetic dynamics refers to the time evolution of a synapse output response from a spike input. This time response has the shape of an exponential decay. Homeostatic plasticity refers to the capacity of neuron networks to regulate their own excitability relative to neural network activity. This self-regulation operates to evolve the output average spike rate over the long term to a target value. Axonal delays refer to delays in an axon, which typically conduct electrical impulses away from the neuron's cell body. The delay is associated with the time for a spike to be transmitted across an axon. An axon connects a neuron core producing a spike to target synapses that receive delayed versions of that spike.

In U.S. Pat. No. 7,822,698, issued Oct. 26, 2010, J. Cruz-Albrecht and P. Petre describe "Spike Domain and Pulse Domain Non-Linear Processors". The neuron circuits described in U.S. Pat. No. 7,822,698 have a spike domain feature but do not include the circuits to emulate features of kinetic dynamics, homeostatic plasticity, and axonal delays.

J. Cruz-Albrecht, M. Yung and Srinivasa describe another circuit in "Energy-Efficient Neuron, Synapse and STDP Circuits," *IEEE Trans. on Biomedical Circuits and Systems*, pp. 246-256, Vol. 6, No. 3, June 2012. This circuit does describe a neuron core but also does not include any circuitry to provide features for kinetic dynamics, homeostatic plasticity, and axonal delays.

J. Lazzaro describes yet another circuit in "Low-Power Silicon Spiking Neurons and Axons," *IEEE Symposium on Circuits and Systems*, pp. 2220-2223, 1992. This paper describes a circuit for homeostatic plasticity and kinetic dynamics. However a capacitor is required for each input to a synapse associated with a neuron, which can be a very large number of capacitors.

C. Bartolozzi et al. in "Silicon Synaptic Homoestasis" *Brain Inspired Cognitive Systems*, Oct 2006 describe a circuit with a type of axonal delay. But the circuit requires two capacitors for each delay stage.

J. Schroyer in U.S. Pat. No. 3,569,842 issued Mar. 9, 1971 and titled "Pulse Delay Circuit" describes a pulse delay circuit that supports a delay longer than the pulse width; however, the circuit does not preserve the pulse width information. The output pulse width is instead pre-set to a fixed value as a function of the circuit parameters.

J. Wharton in U.S. Pat. No. 3,824,411 issued Jul. 16, 1974 and titled "Pulse Delay Circuit" describes a circuit that delays the rising and falling edges of the pulse independently, hence preserving the pulse width information; however, the circuit does not support a greater delay than the width of the pulse.

Digital pulse delay circuits, while providing very flexible delays and pulse width control, suffer from high complexity and circuit area requirements, and because of the large number of neurons in a neural net, digital pulse delay circuits are cumbersome.

In many applications such as in a digital system, the pulse width is often known or pre-defined rather than field dependent. The delay circuit described by J. Schroyer in U.S. Pat. No. 3,569,842 does not preserve the input pulse information but rather generates a fixed pulse width for its output. In a neural circuit, the pulse or spike width varies and does have an impact on the response of the circuit receiving it. Also, in a digital system, long delays or multiple delays are usually implemented by cascading many stages of delay circuit where the delay of each is less than the pulse width, such as described by J. Wharton in U.S. Pat. No. 3,824,411.

What is needed is a circuit that overcomes the disadvantages of the prior art. It would be desirable to have a better more compact delay circuit. It would also be desirable to reduce the complexity of the circuitry due to the challenge of modeling the human brain, while more accurately modeling the biological properties of neurons and synapses. The embodiments of the present disclosure answer these and other needs.

SUMMARY

In a first embodiment disclosed herein, an analog pulse delay circuit comprises an input line, a first flip flop (FF) having a set input, a reset input, and an output, the set input connected to the input line, a first field effect transistor (FET) having a gate, a source, and a drain, the gate connected to the output of the first flip flop, a first resistor capacitor circuit coupled to the drain and source of the first FET, and between a voltage and a ground, a first comparator connected to an output of the first resistor capacitor circuit and to a first voltage reference for comparing the output of the first resistor capacitor circuit and the first voltage reference, the first comparator having an output, an AND gate having a first input connected to the output of the first comparator and having a second input, and an output, an OR gate having a first input connected to the input line, a second input connected to an inverted output of the first FF, and an output, a second flip flop (FF) having a set input, a reset input, and an output, the reset input connected to the output of the OR gate, and the set input connected to an inverted output of the OR gate, a second field effect transistor (FET) having a gate, a source, and a drain, the gate connected to the output of the second flip flop, a second resistor capacitor circuit coupled to the drain and source of the second FET, and between the voltage and the ground, a second comparator connected to an output of the second resistor capacitor circuit and to the first voltage reference for comparing the output of the second resistor capacitor circuit and the first voltage reference, the second comparator having an output, and the output of the second comparator connected to the reset input of the first flip flop and an inverted output of the second comparator connected to the second input of the AND gate.

In another embodiment disclosed herein, an analog pulse delay circuit comprises an input line, a first flip flop (FF) having a set input, a reset input, and an output, the set input connected to the input line, a first field effect transistor (FET) having a gate, a source, and a drain, the gate connected to the output of the first flip flop, a first resistor capacitor circuit coupled to the drain and source of the first FET, and between a voltage and a ground, a first comparator connected to an output of the first resistor capacitor circuit and to a first voltage reference for comparing the output of the first resistor capacitor circuit and the first voltage reference, the first comparator having an output, output logic having a first input connected to the output of the first comparator and having a second input and an output, gate logic having a first input connected to the input line, a second input coupled to the output of the first FF, and an output, a second flip flop (FF) having a set input, a reset input, and an output, the reset input coupled to the output of the gate logic, and the set input coupled to the output of the gate logic, a second field effect transistor (FET) having a gate, a source, and a drain, the gate connected to the output of the second flip flop, a second resistor capacitor circuit coupled to the drain and source of the second FET, and between the voltage and the ground, a second comparator connected to an output of the second resistor capacitor circuit and to the first voltage reference for comparing the output of the second resistor capacitor circuit and the first voltage reference, the second comparator having an output, and the output of the second comparator coupled to the reset input of the first flip flop and coupled to the second input of the output logic.

In still another embodiment disclosed herein, an analog pulse delay circuit comprises an input line, a first flip flop (FF) having a set input, a reset input, and an output, the set input connected to the input line, a first transistor coupled to the output of the first flip flop, a first resistor capacitor circuit coupled to the first transistor, and between a voltage and a ground, a first comparator coupled to an output of the first resistor capacitor circuit and to a first voltage reference for comparing the output of the first resistor capacitor circuit and the first voltage reference, the first comparator having an output, output logic having a first input coupled to the output of the first comparator and having a second input, gate logic having a first input connected to the input line, a second input coupled to the first FF, and an output, a second flip flop (FF) having a set input, a reset input, and an output, the reset input coupled to the output of the gate logic, and the set input coupled to the output of the gate logic, a second transistor coupled to the output of the second flip flop, a second resistor capacitor circuit coupled to the second transistor, and between the voltage and the ground, a second comparator coupled to an output of the second resistor capacitor circuit and to the first voltage reference for comparing the output of the second resistor capacitor circuit and the first voltage reference, the second comparator having an output, and the output of the second comparator coupled to the reset input of the first flip flop and coupled to the second input of the output logic.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 2A shows one possible circuit to implement an axonal delay, and FIG. 2B shows a circuit diagram of one delay stage of FIG. 2A;

DETAILED DESCRIPTION

Figure 1A:
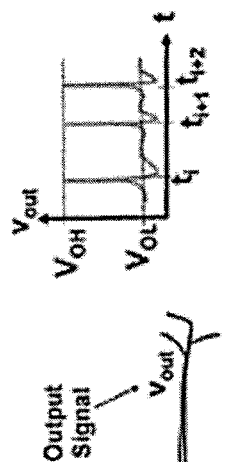
FIG. 1A shows a simplified diagram of a biological neuron.
Figure 1B:
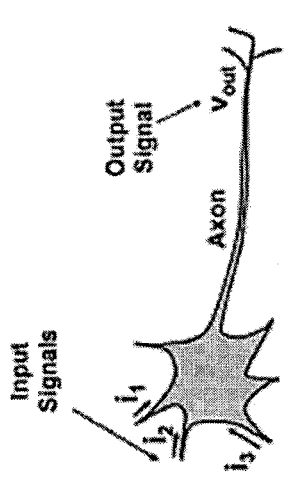
FIG. 1B shows an example of a typical output signal of a neuron.
Figure 1C:
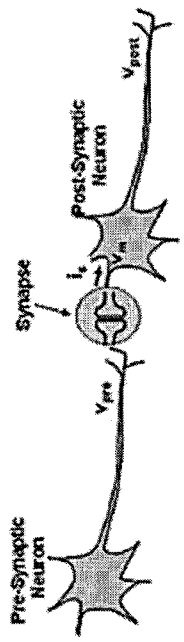
FIG. 1C shows a simplified model of a synapse circuit in accordance with the prior art.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

FIG. 2A shows a possible circuit for modeling an axonal delay, which has as an input, y 38, a series of delay stages 90, 92, 94, and 96, and a selector 98. The selector 98 is controlled by control_d 42 and selects the output y 38, the output of delay stage 90, the output of delay stage 92, the output of delay stage 94, or the output of delay stage 96. So, control_d, which is a digital control, selects between no delay of 4 possible delay values.

FIG. 2B shows a circuit diagram of one of the delay stages of FIG. 2A. Each delay stage may have a flip flop 100, a transconductance amplifier 102, a capacitor 110, and a comparator 106. During operation a current Id charges capacitor 110 until vd 104 reaches a reference value, reference_d 108. The reference_d 108 can be used as an analog control. When the capacitor is charged to the level of reference_d 108, the switch 112 is closed and the capacitor 110 is discharged and the flip flop is reset to again let an input voltage charge the capacitor 110 and the switch 112 is opened.

In an integrated circuit implementation, a delay stage may be implemented in a differential circuit. One embodiment of a differential circuit uses two flip-flops, two amplifiers, two capacitors and one differential comparator.

Figure 3:
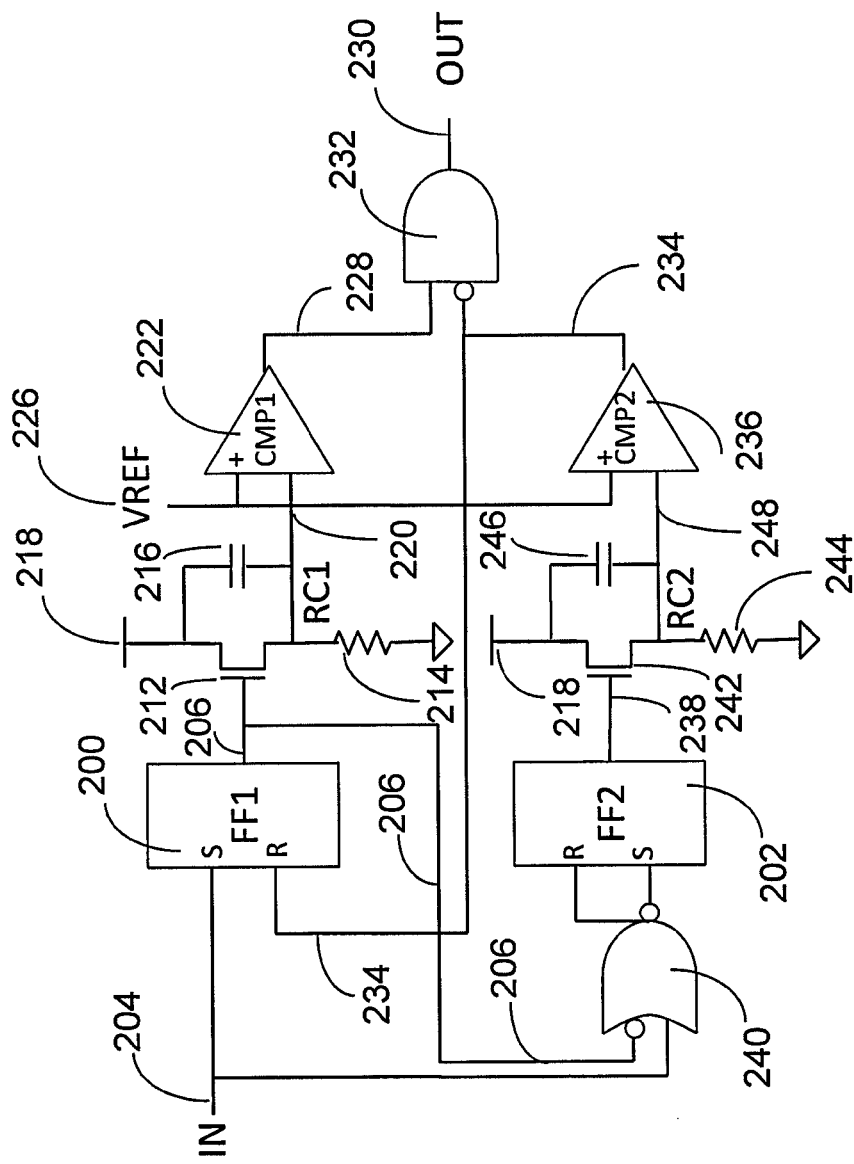
FIG. 3 shows a delay circuit in accordance with the present disclosure.

FIG. 3 shows a delay circuit in accordance with the present disclosure that is a compact analog delay circuit that can delay a full pulse, both its rising and falling edges, beyond the duration of the pulse while preserving the pulse width information. The delay is adjustable with a control voltage 226 and multiple delay outputs can be added without adding capacitors, as shown in FIG. 5.

Figure 5:
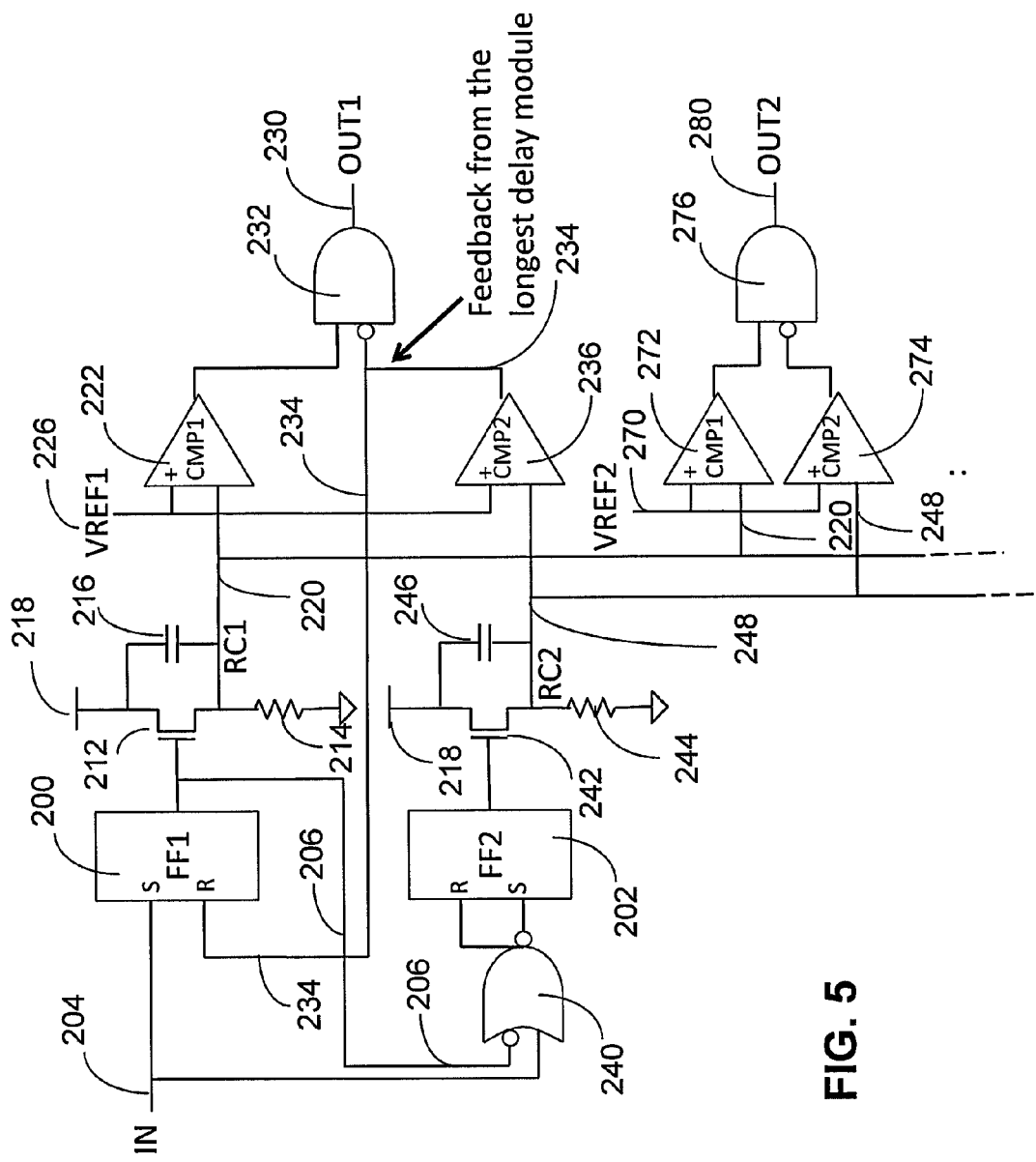
FIG. 5 shows a delay circuit having multiple delay outputs in accordance with the present disclosure.

In FIGS. 3 and 5 connections are where lines meet in a T. Crossed lines are not connected. For example Vref line 226 is not connected to lines 240 or 234.

The delay circuits of FIGS. 3 and 5 may be used to implement an axonal delay as part of a neural electronic processing system, and may be used instead of the delay circuits shown in FIGS. 2A and 2B. The delay circuits of FIGS. 3 and 5 have an advantage over the delay circuits shown in FIGS. 2A and 2B, because, as described below with reference to FIG. 5, multiple delay outputs can be added without adding capacitors, while the delay circuits shown in FIGS. 2A and 2B require that an additional capacitor 110, as shown in FIG. 2B, be added for each additional delay output.

The delay circuits of FIGS. 3 and 5 may also be used to implement delays of an input pulse in many other applications.

The delay circuit of FIG. 3 is very compact because it uses only two main capacitors, which predominantly determine the area of the circuit, to achieve variable and multiple delay outputs. Moreover, the delay circuit of FIG. 3 supports the delay of pulses beyond the duration of the pulse itself as required in a neural circuit.

Figure 4:
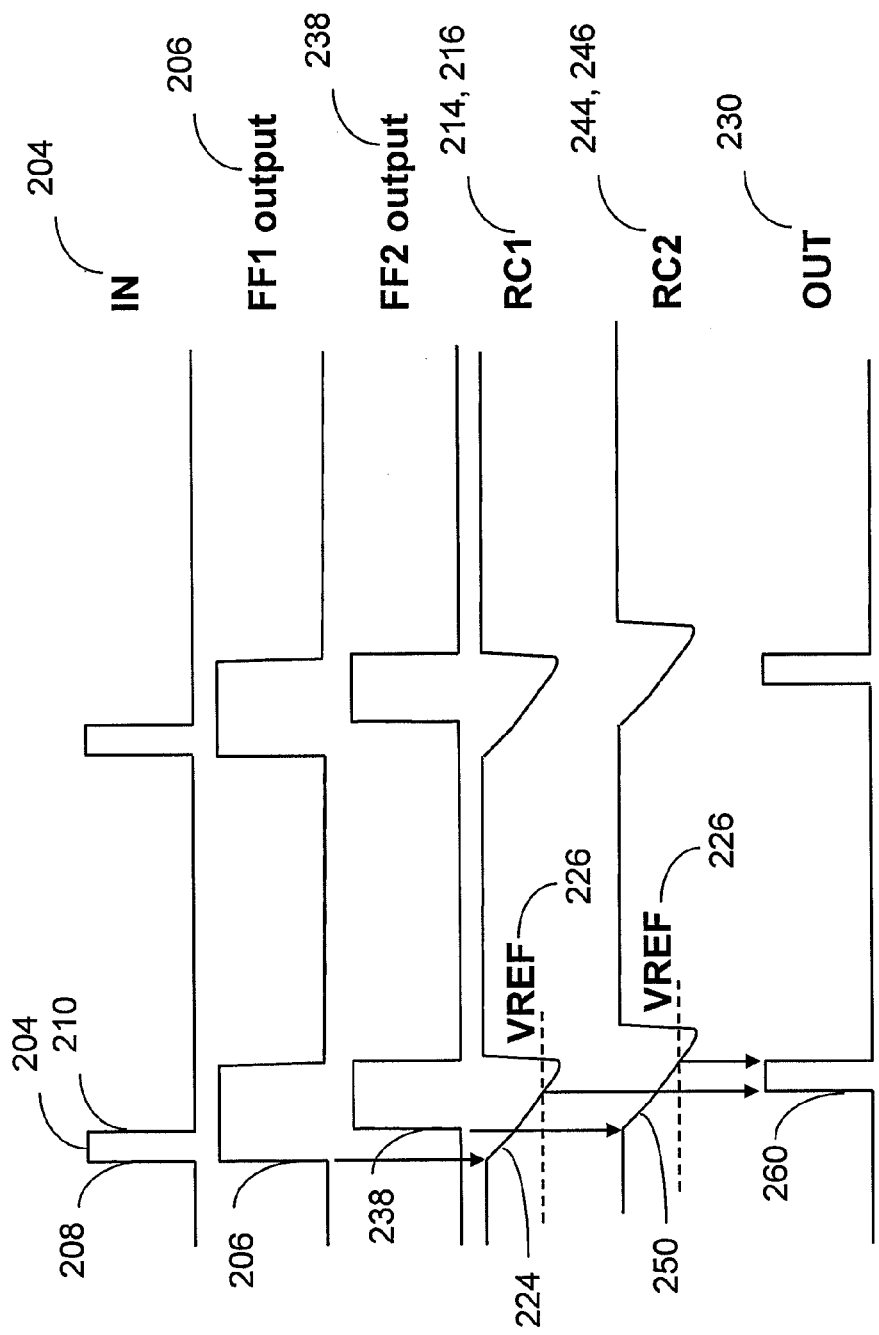
FIG. 4 shows a timing diagram for the delay circuit of FIG. 3 in accordance with the present disclosure.

The delay circuit of FIG. 3 has two set-reset flip-flops 200 and 202. The flip flop 200 from the upper path is set and has a set or high level on output 206 from the rising edge 208 of the input pulse 204, as shown in the timing diagram of FIG. 4. The output 206 stays high or set even after the input pulse 204 falling edge 210, as shown in FIG. 4. The output 206 is connected to the gate of field effect transistor (FET) 212, which may be a pFET or a positive channel FET. Other transistors may be used such as bipolar and CMOS devices, preferably not inverting. Resistor capacitor circuit RC1 has a resistor 214 connected to the drain (or source, because a source and drain of a FET are generally reversible) of FET 212 and to ground, and has a capacitor 216 connected between the source and drain of the FET 212. The source (or drain) of the FET 212 is connected to voltage at voltage source 218. The voltage source charges capacitor 216; however, when the FET 212 is turned on when output 206 is set, the RC1 circuit exponentially discharges, according to the RC1 values of resistor 214 and capacitor 216. The input 220 to comparator 222 has an exponentially varying waveform, such as waveform 224 shown in FIG. 4, which can be seen to exponentially decay. The input 220 is compared by comparator 222, and when input 220 is less than Vref 226, the comparator 222 output 228 goes high, and the output 230 from AND gate 232 goes high, because the output 234 from comparator 236 is low, which is inverted before the AND gate 232.

When the input pulse 204 goes low at falling edge 210 of the input pulse 204, flip flop 202 has a set or high level on output 238, as shown in FIG. 4. The input pulse 204 is an input to OR gate 240, and an inverted output of OR gate 240 is connected to the set input of flip flop 202. The output 238 is connected to the gate of field effect transistor (FET) 242, which also may be a pFET or positive channel FET, and may also be a bipolar or CMOS transistor. Resistor capacitor circuit RC2 has a resistor 244 connected to the drain (or source, because a source and drain of a FET are generally reversible) of FET 242 and to ground, and has a capacitor 246 connected between the source and drain of the FET 242. The source (or drain) of the FET 242 is connected to voltage source 218. The voltage source charges capacitor 246; however, when the FET 238 is turned on when output 238 is set, the RC2 circuit exponentially discharges, according to the RC2 values of resistor 244 and capacitor 246. The input 248 to comparator 236 has an exponentially varying waveform, such as waveform 250 shown in FIG. 4, which can be seen to exponentially decay. The input 248 is compared by comparator 236, and when input 248 is less than Vref 226, the comparator 236 output 234 goes high. The output 234 is inverted and input to AND gate 232, which causes the output 230 from AND gate 232 to go low. The high output 234 also resets flip flop 200 and output 206 goes low, which in turn resets flip flop 202. The gates 240 and 232 may be CMOS or bipolar devices.

The resulting output pulse 260 on output 230 has the same pulse width as the input pulse 204, as shown in FIG. 4. In order for the output pulse 260 to have the same pulse width as the input pulse 204 the RC1 and RC2 need to have the same resistor and capacitor values, resistor 214 being the same value as resistor 244 and capacitor 216 being the same value as capacitor 246.

The amount of delay of the output pulse 260 from the input pulse 204 may be set by adjusting the Vref voltage 218 for a delay within a limit set by the exponentially varying waveform, or by selection of the RC1 and RC2 resistors and capacitors, which determine the exponential rate of discharge. The output pulse 260 may be delayed beyond the duration of the input pulse 204 as required in a neural circuit.

In the circuits of FIGS. 3 and 5, the FETs 212 and 242 may be replaced with bipolar transistors connected to resistor-capacitor circuits, which are connected to comparators 222 and 236, respectively. The flip flops 200 and 212, the comparators 222 and 236, and the gates 240 and 232 may be CMOS or bipolar devices.

FIG. 5 shows a delay circuit having multiple delay outputs in accordance with the present disclosure. The output pulse on output 230 of FIG. 5 is produced in the same manner as described above. Additional output pulses having the same pulse width as the input pulse 204, such as an output pulse on output 280, shown in FIG. 5, may be produced by adding additional comparator pairs, such as comparators 272 and 274, connected to an AND gate in the same manner as comparators 222 and 236, such as AND gate 276. The inputs to comparators 272 and 274 are the same inputs 220 and 248 to comparators 222 and 234, respectively; however, the Vref2 270 may be different than Vref1 226, to set a different delay of the output pulse on output 280 from the input pulse 204.

In order for the reset of flip flops 200 and 202 to operate properly, the feedback 234, as shown in FIG. 5, needs to be from the comparator pair associated with the longest pulse delay of the multiple delayed output pulses. Therefore in FIG. 5, the delay for the output pulse at output 230 is greater than the delay for the output pulse at output 280, or any other output in a multiple output circuit.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. An analog pulse delay circuit comprising:
an input line;
a first flip flop (FF) having a set input, a reset input, and an output, the set input connected to the input line;
a first field effect transistor (FET) having a gate, a source, and a drain, the gate connected to the output of the first flip flop;
a first resistor capacitor circuit coupled to the drain and source of the first FET, and between a voltage and a ground;
a first comparator connected to an output of the first resistor capacitor circuit and to a first voltage reference for comparing the output of the first resistor capacitor circuit and the first voltage reference, the first comparator having an output;
an AND gate having a first input connected to the output of the first comparator and having a second input, and an output;
an OR gate having a first input connected to the input line, a second input connected to an inverted output of the first FF, and an output;
a second flip flop (FF) having a set input, a reset input, and an output, the reset input connected to the output of the OR gate, and the set input connected to an inverted output of the OR gate;
a second field effect transistor (FET) having a gate, a source, and a drain, the gate connected to the output of the second flip flop;
a second resistor capacitor circuit coupled to the drain and source of the second FET, and between the voltage and the ground;
a second comparator connected to an output of the second resistor capacitor circuit and to the first voltage reference for comparing the output of the second resistor capacitor circuit and the first voltage reference, the second comparator having an output; and the output of the second comparator connected to the reset input of the first flip flop and an inverted output of the second comparator connected to the second input of the AND gate.

2. The analog pulse delay circuit of claim 1 wherein the first and second resistor capacitor circuits are configured so that when the input line has an input pulse having a rising edge, a falling edge and a pulse width, the output of the AND gate has an output pulse delayed by a first delay from the rising edge of the input pulse, and so that a pulse width of the output pulse is substantially equal to the pulse width of the input pulse.

3. The analog pulse delay circuit of claim 1 wherein:
the first resistor capacitor circuit and the second resistor capacitor circuit each comprise a resistor and a capacitor; and
the value of the resistor is the same in the first resistor capacitor circuit and the second resistor capacitor circuit; and
the value of the capacitor is the same in the first resistor capacitor circuit and the second resistor capacitor circuit.

4. The analog pulse delay circuit of claim 1:
wherein the first resistor capacitor circuit comprises:
a first resistor coupled between the drain of the first FET and ground; and
a first capacitor coupled between the source and the drain of the first FET;
wherein the second resistor capacitor circuit comprises:
a second resistor coupled between the drain of the second FET and ground; and
a second capacitor coupled between the source and the drain of the second FET;
wherein the first resistor and the second resistor have the same value; and
wherein the first capacitor and the second capacitor have the same value.

5. The analog pulse delay circuit of claim 1 wherein the first and second field effect transistors are positive channel FETs.

6. The analog pulse delay circuit of claim 1:
wherein the output of the first resistor capacitor circuit has an exponentially varying waveform; and
wherein the output of the second resistor capacitor circuit has substantially the same exponentially varying waveform.

7. The analog pulse delay circuit of claim 1 further comprising:
a plurality of pairs of comparators connected to the output of the first resistor capacitor circuit and to the output of the second resistor capacitor circuit, each pair of comparators comprising a first comparator for comparing the output of the first resistor capacitor circuit to a respective voltage reference different than the first voltage reference, and a second comparator for comparing the output of the second resistor capacitor circuit to the respective voltage reference; and
wherein each respective pair of comparators is connected to a respective output logic having a respective output that delays the input pulse by a respective delay depending on the respective voltage reference, the respective output having a delayed respective output pulse having a pulse width equal to the pulse width on the input line.

8. The analog pulse delay circuit of claim 7 wherein each respective output logic comprises:
an AND gate having a first input connected to an output of the first comparator of the respective pair of comparators, a second input connected to an inverted output of the second comparator of the respective pair of comparators, and the respective output.

9. The analog pulse delay circuit of claim 1 further comprising:
an electronic circuit for modeling neural networks coupled to the input line;
wherein the analog pulse delay circuit is configured to model an axonal delay.

10. An analog pulse delay circuit comprising:
an input line;
a first flip flop (FF) having a set input, a reset input, and an output, the set input connected to the input line;
a first field effect transistor (FET) having a gate, a source, and a drain, the gate connected to the output of the first flip flop;
a first resistor capacitor circuit coupled to the drain and source of the first FET, and between a voltage and a ground;
a first comparator connected to an output of the first resistor capacitor circuit and to a first voltage reference for comparing the output of the first resistor capacitor circuit and the first voltage reference, the first comparator having an output;
output logic having a first input connected to the output of the first comparator and having a second input and an output;
gate logic having a first input connected to the input line, a second input coupled to the output of the first FF, and an output;
a second flip flop (FF) having a set input, a reset input, and an output, the reset input coupled to the output of the gate logic, and the set input coupled to the output of the gate logic;
a second field effect transistor (FET) having a gate, a source, and a drain, the gate connected to the output of the second flip flop;
a second resistor capacitor circuit coupled to the drain and source of the second FET, and between the voltage and the ground;
a second comparator connected to an output of the second resistor capacitor circuit and to the first voltage reference for comparing the output of the second resistor capacitor circuit and the first voltage reference, the second comparator having an output; and
the output of the second comparator coupled to the reset input of the first flip flop and coupled to the second input of the output logic.

11. The analog pulse delay circuit of claim 10 where the first and second resistor capacitor circuits are configured so that when the input line has an input pulse having a rising edge, a falling edge and a pulse width, the output of the output logic has an output pulse delayed by a first delay from the rising edge of the input pulse and so that a pulse width of the output pulse is equal to the pulse width of the input pulse.

12. The analog pulse delay circuit of claim 10:
wherein the first resistor capacitor circuit comprises:
a first resistor coupled between the drain of the first FET and ground; and
a first capacitor coupled between the source and the drain of the first FET;
wherein the second resistor capacitor circuit comprises:
a second resistor coupled between the drain of the second FET and ground; and
a second capacitor coupled between the source and the drain of the second FET;
wherein the first resistor and the second resistor have the same value; and wherein the first capacitor and the second capacitor have the same value.

13. The analog pulse delay circuit of claim 10 wherein the first and second field effect transistors are positive channel FETs.

14. The analog pulse delay circuit of claim 10 further comprising:
a plurality of pairs of comparators connected to the output of the first resistor capacitor circuit and to the output of the second resistor capacitor circuit, each pair of comparators comprising a first comparator for comparing the output of the first resistor capacitor circuit to a respective voltage reference different than the first voltage reference, and a second comparator for comparing the output of the second resistor capacitor circuit to the respective voltage reference; and
wherein each respective pair of comparators is connected to a respective output logic having a respective output that delays the input pulse by a respective delay depending on the respective voltage reference, the respective output having a delayed respective output pulse having a rising edge, a falling edge and a pulse width equal to the pulse width on the input line.

15. The analog pulse delay circuit of claim 14 wherein each respective output logic comprises:
an AND gate having a first input connected to an output of the first comparator of the respective pair of comparators, a second input connected to an inverted output of the second comparator of the respective pair of comparators, and the respective output of the output logic.

16. The analog pulse delay circuit of claim 14 wherein each respective delay is less than the first delay.

17. The analog pulse delay circuit of claim 10 further comprising:
an electronic circuit for modeling neural networks coupled to the input line;
wherein the analog pulse delay circuit is configured to model an axonal delay.

18. A pulse delay circuit comprising:
an input line;
a first flip flop (FF) having a set input, a reset input, and an output, the set input connected to the input line;
a first transistor coupled to the output of the first flip flop;
a first resistor capacitor circuit coupled to the first transistor, and between a voltage and a ground;
a first comparator coupled to an output of the first resistor capacitor circuit and to a first voltage reference for comparing the output of the first resistor capacitor circuit and the first voltage reference, the first comparator having an output;
output logic having a first input coupled to the output of the first comparator and having a second input;
gate logic having a first input connected to the input line, a second input coupled to the first FF, and an output;
a second flip flop (FF) having a set input, a reset input, and an output, the reset input coupled to the output of the gate logic, and the set input coupled to the output of the gate logic;
a second transistor coupled to the output of the second flip flop;
a second resistor capacitor circuit coupled to the second transistor, and between the voltage and the ground;
a second comparator coupled to an output of the second resistor capacitor circuit and to the first voltage reference for comparing the output of the second resistor capacitor circuit and the first voltage reference, the second comparator having an output; and the output of the second comparator coupled to the reset input of the first flip flop and coupled to the second input of the output logic.

19. The pulse delay circuit of claim 18 wherein the first and second resistor capacitor circuits are configured so that when the input line has an input pulse having a rising edge, a falling edge and a pulse width, the output of the output logic has an output pulse delayed by a first delay from the rising edge of the input pulse, and so that a pulse width of the output pulse is equal to the pulse width of the input pulse.

* * * * *